United States Patent
Izumi

[11] 3,710,541
[45] Jan. 16, 1973

[54] SYNTHETIC RESIN SEAMLESS TETRAHEDRON

[76] Inventor: Shinjiro Izumi, 18-7, Ryouke 1-chome, Urawa-shi, Japan

[22] Filed: Dec. 22, 1970

[21] Appl. No.: 100,568

[30] Foreign Application Priority Data

Dec. 22, 1969 Japan.............................44/103598
Dec. 29, 1969 Japan...................................44/489

[52] U.S. Cl. ........................53/29, 53/183, 53/384, 53/386
[51] Int. Cl. .........................B65b 9/10, B65b 43/30
[58] Field of Search....53/28, 29, 183, 187, 384, 386, 53/180, 141

[56] References Cited

UNITED STATES PATENTS

| | | | |
|---|---|---|---|
| 3,236,021 | 2/1966 | Wagner et al. | 53/29 |
| 2,962,843 | 12/1960 | Hoelzer et al. | 53/28 X |
| 3,557,526 | 1/1971 | Hartmann | 53/183 |
| 3,543,466 | 1/1970 | Forsberg | 53/384 X |

*Primary Examiner*—Theron E. Condon
*Assistant Examiner*—Eugene F. Desmond
*Attorney*—Toren & McGeady

[57] ABSTRACT

An improved container of tetrahedral shape comprising a seamless tube of thermoplastic material having the opposite ends thereof sealed in straight lines in crosswise directions relative to one another; and the method of cutting, forming, expanding, filling and sealing such tubular material with novel material handling techniques to provide filled containers of tetrahedral shape.

4 Claims, 19 Drawing Figures

PATENTED JAN 16 1973 3,710,541

INVENTOR
SHINJIRO IZUMI
BY
Torem and McGeady
ATTORNEYS

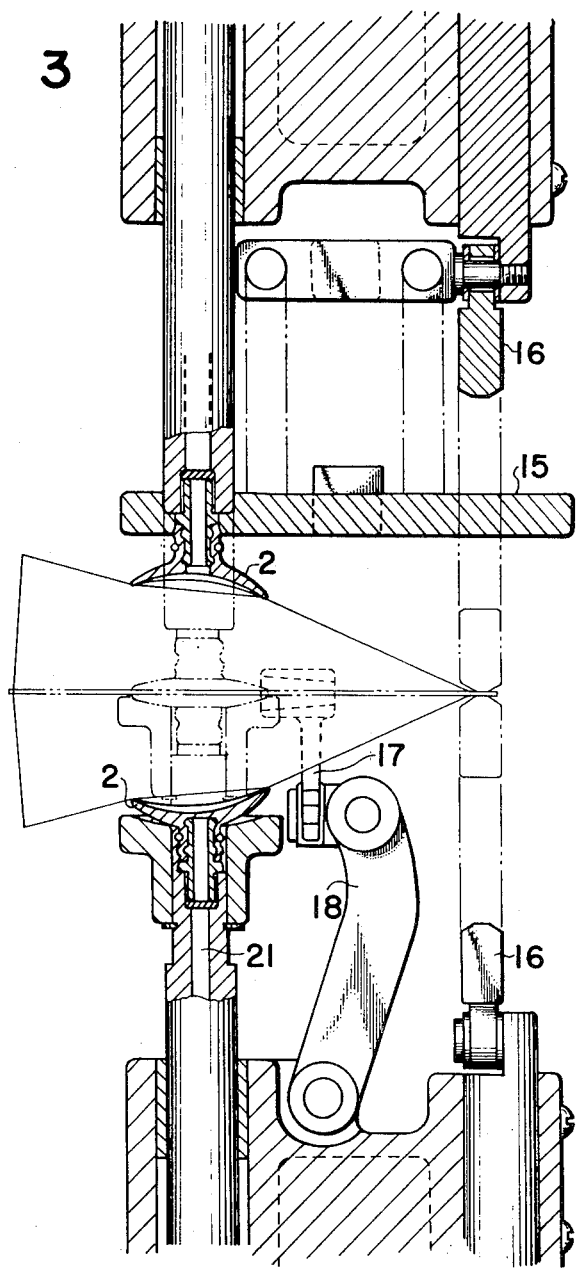

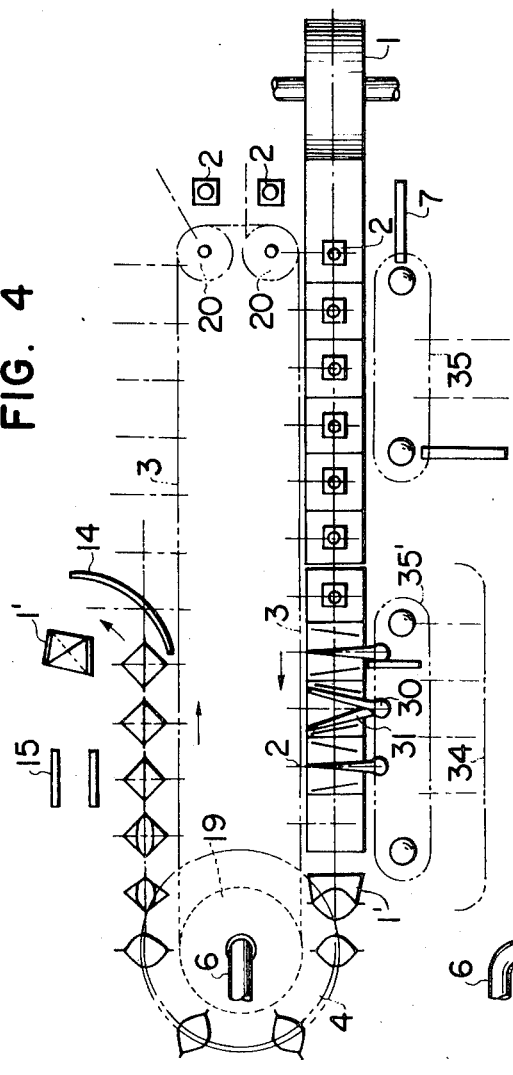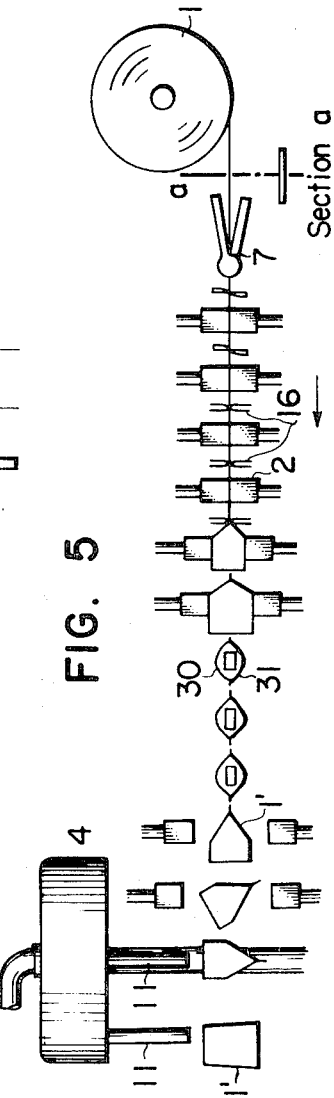

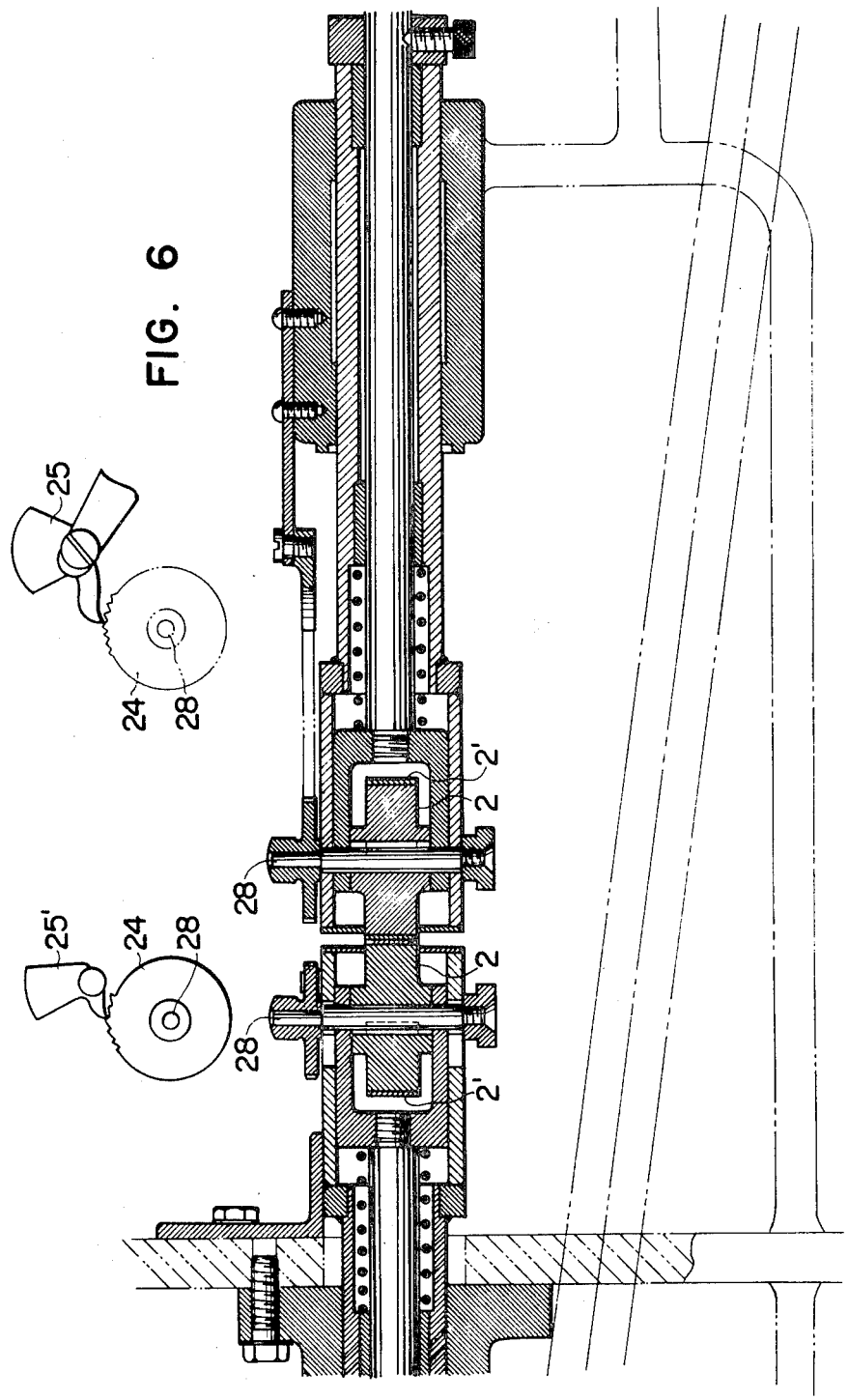

INVENTOR.
SHINJIRO IZUMI

SYNTHETIC RESIN SEAMLESS TETRAHEDRON

BACKGROUND OF THE INVENTION

It is already known to use a tetrahedron container for milk and other fluids or small particle solids (powdered or granulated materials). In the conventional tetrahedron container consisting of paper or paper laminated with synthetic resin or paper coated with wax, it is necessary to form a longitudinal seam in making it from a tube. On this account, the manufacturing process is complicated and moreover there is a risk of leakage of the contents from this seam and there is a risk that the sealed opening may be imperfect.

The present invention is directed at eliminating the defects of such conventional containers and providing a container which is easy to manufacture and affords excellent seals.

One special feature of the present invention resides in employing a seamless flatly folded tube as the material for the tetraphedron thereby eliminating problems due to the presence of a longitudinal seam.

The second special feature of the present invention resides in that the opening of the subsequently sealed tetrahedral unit makes possible keeping it widely opened without aid of the other means by changing the direction of the folds in such a manner that these folds may just be overlapped.

Another special feature of the present invention resides in that the folds of the tube are adapted to be guided in the state in which these folds are overlapped by introducing the fold of the tube in the grooves circumferentially provided at the opposite places of the rolls constituting a portion for pulling out the tube.

SUMMARY OF THE INVENTION

The present invention relates to a novel article in the form of a tetrahedrally shaped container of thermoplastic material with seals disposed along two edges of crosswise orientation in the article; and it further relates to an improved method of forming a bag from a seamless tube of thermoplastic material, filling and then sealing the bag in producing the tetrahedral article by novel handling techniques.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 3 is a detail view illustrating a vacuum holding device of the apparatus of FIG. 1;

FIG. 4 is a plan view of another embodiment of such apparatus;

FIG. 5 is an elevation of the apparatus of FIG. 4;

FIG. 6 is a sectional view of the adhesive holding device employed in the embodiment of FIG. 4;

DETAILED DESCRIPTION OF THE INVENTION

Figure 1:
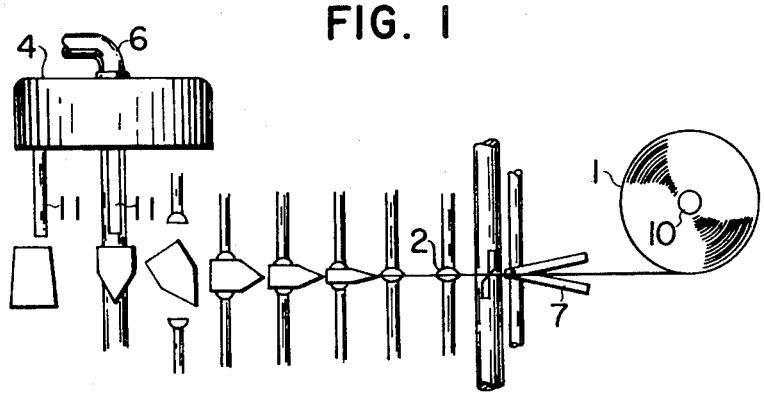
FIG. 1 is an elevation view of one embodiment of the apparatus.
Figure 2:
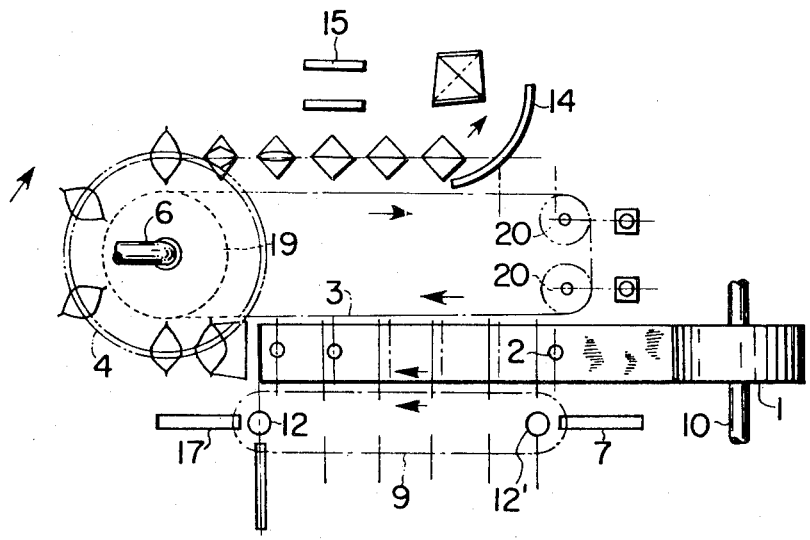
FIG. 2 is a plan view of the apparatus of FIG. 1.

Referring to FIGS. 1 and 2, an adsorbing member or a holding device 2 is mounted on a chain 3 moving around the machine body on sprocket wheels 19 and 20, a chain 9 runs parallel with this body around shafts 12, 12' in the direction of the arrow and in concert with the chain 3 of the body; a cutting blade device 7 is mounted on this chain 9, a flatly folded tube 1 of seamless synthetic resin thermoplastic material is pulled away from the roll on shaft 10 by the vacuum holding device 2 and is gradually cut off by means of the cutting device 7 moving along with tube 1; the rear edge of the sealed tube is heat sealed as described hereinafter by means of a heat sealing member 16, the flatly folded tube is expanded by the holding device while the fold of the folded tube is supported by a support member 17; and then the vacuum in a suction tube 21 is released and the holding device 2 is retracted from the expanded article which is supported by the supporting member 17. Now, the tubular article is in an expanded state with one end open as shown at the left of FIG. 3 and it is moved to an erect position by means of a lever 18, and it is filled with a fixed quantity of fluid or small particle solids supplied from a tube 11 beneath a rotating rotary head or tank 4 as shown in FIGS. 1 and 2. When this filling up is completed, as shown on the upper part of FIG. 2, the open end of the plastic container is gradually closed and heat sealed by heat seal plates 15, (see also FIG. 3), fluid or small solids are received and sealed in the container which now has the shape of a tetrahedron. The sealed container is detached from the machine by contact with a guide 14 and fed onto a conveyor (not illustrated).

The fluid or small solids are received in a tank 4 from a tube 6. The holding device 2 and the heat seal device 15 are mounted on the chain 3 running with a combination of circular and rectilinear motions provided by means of a sprocket wheel 19 and sprocket wheels 20 to facilitate the cutting and sealing of the tubular material. An important benefit of this invention is the economical and faster handling resulting from the use of a preformed seamless synehetic resin tube supplied as a roll of flattened material on the core or shaft 10; whereas conventional systems involve first forming a tube from the material and then making a continuous longitudinal seam. In the case of seamed containers marketed up to the present, 5,000 to 6,000 pieces per hour are maximum production rates, while this new method has three important advantages, namely, such high efficiency that production rates of 20,000 to 30,000 pieces per hour are possible, a machine of smaller size serves the purpose and the economical handling previously mentioned.

In the second embodiment shown in FIGS. 4 to 12, and referring now to FIGS. 4 and 5, a flatly folded seamless tube 1 is drawn from the supply roll by a holding device 2' mounted on the continuously moving chain 3 which is rotated by a large sprocket wheel 19 and two small sprocket wheels 20; and, in this case, a clamp pulling member besides the holding device 2' may be provided. A cutting blade device 7 is mounted on a continuously moving endless chain 35 parallel with chain 3. This cutting device travels in concert with the chain 3 and cuts off a predetermined length of the flat tube 1; then the rear end of the cut tube is sealed by the heat seal member 16. Thereafter, the tube is expanded by spreading the holding device 2' and, at the same time, the open end of the tube is turned outwardly and, at this time the pivotally extendable compasses 30, 31 are inserted therein from a chain 35' running in concert with the chain 3 of FIG. 4. The end of the heat-sealed tube is securely formed by spreading the compasses and, at the same time, hot air is usually blown into the interior of the bag or tube whereby it is sterilized. The extendable compasses are heated usually to 100° C or more during their return travel along the rear side 34 of chain 35', this is desirable for sterilization and also for the forming. The bag whose forming is completed is held on both sides by bag holders 17 (see FIG. 7) and the bag 1' is turned 90° to an erect position by the movement of a sector gear 23 connected to said holder and in engagement with a rack gear, and the bag enters a circular travel section of the apparatus where fluid or small particle solids in fixed quantity are filled into the bag from a reservoir tank 4 through the pipe 11. Thereafter, the bag enters a rectilinear travel section of the machine and the open top end of this bag is sealed crosswise at 90° relative to the bottom seal by a heat seal device 15, whereby a sealed tetrahedron 1' is formed and a guide 14 drops it onto a conveyor (not shown) thereunder.

Figure 7:
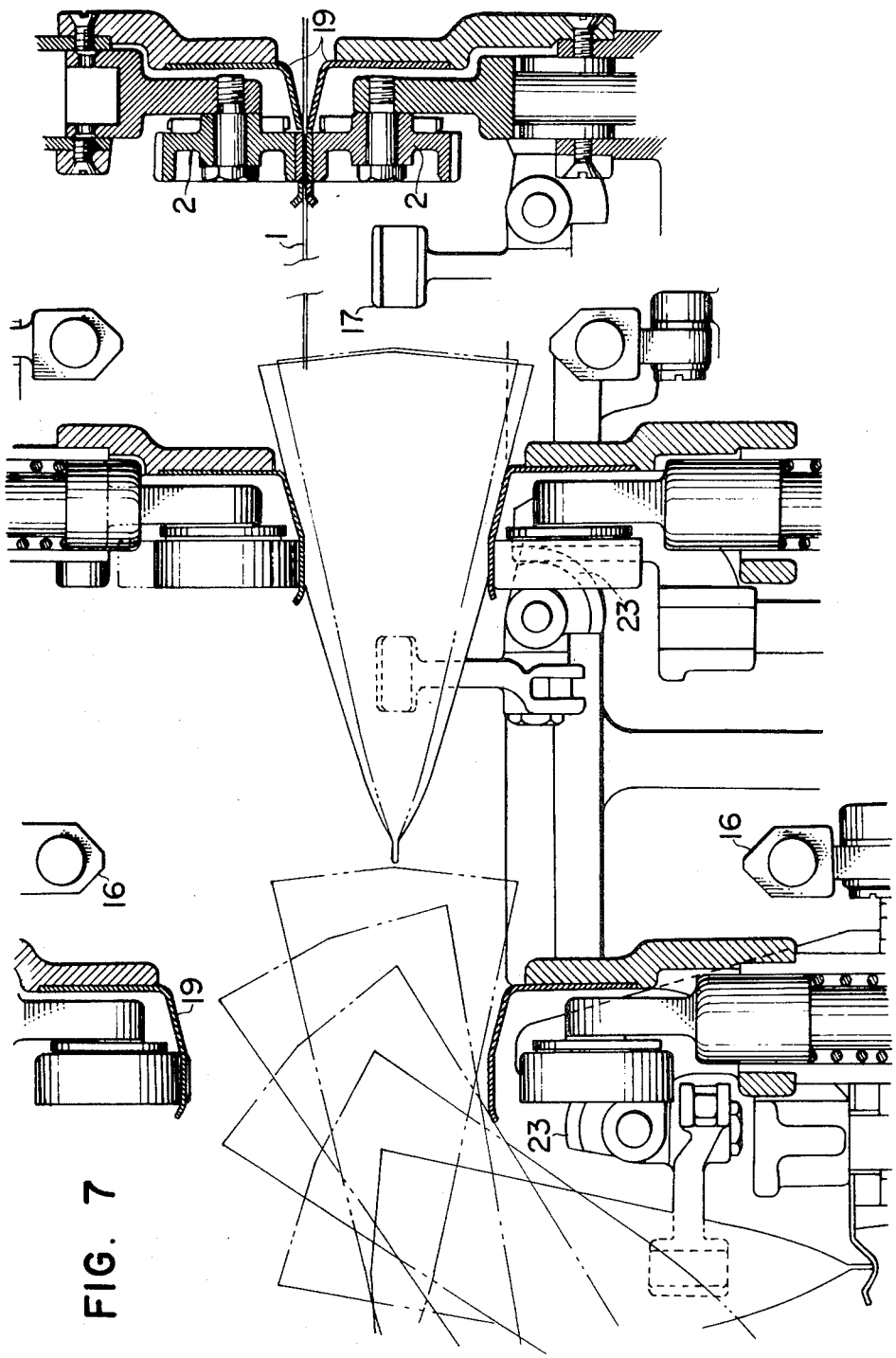
FIG. 7 is a sectional elevation depicting the sequential operation of another modification of the adhesive holding device.

FIG. 6 shows a detailed mechanism for this holding device 2', namely, rollers 36 having a cellophane tape 37 attached to the circumference of each roller with a adhesive coating on the exterior face of the tapes. These cellophane tapes adhere to both surfaces of the flatly folded tube 1 when pressed thereagainst as shown in FIG. 7, and tube 1 is expanded up to a predetermined amount by adhesion to the tapes 37 when the rollers 36 are retracted and the synthetic resin tube is released from the holding device by bearing against a guide plate 38. Further, by utilizing this vertical motion to actuate the pawls 25, 25' against ratchet wheels 24 mounted on pins 28 (shown in FIG. 6) fitted in this holding device 2', namely, when when rollers 36 move vertically relative to each other, the position of the adhesive surfaces of tapes 37 may be changed due to the pawls 25, 25' turning rollers 36 to provide fresh adhesive surfaces. In FIG. 7, a pivoting bag holder 17 and a heat seal device 16 are also illustrated.

Figure 8:
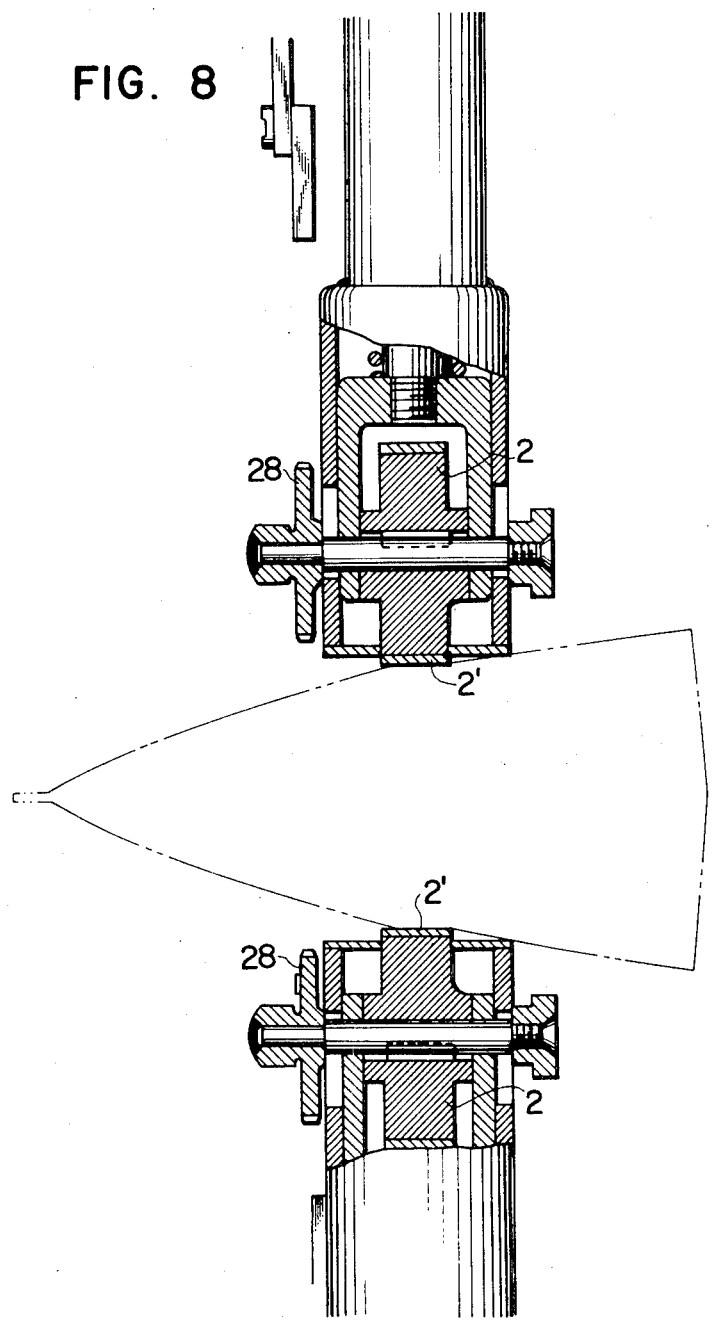
FIG. 8 is an elevation view, partly in section, showing the holding device of FIG. 6 in the expansion operation.
Figure 9:
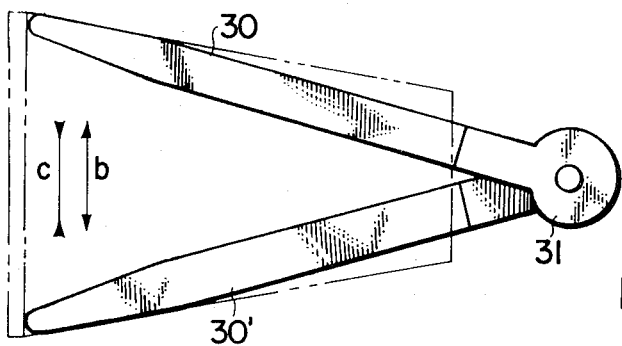
FIGS. 9 and 10 are plan and elevation views showing the operation of an extendable compass like forming member.
Figure 10:
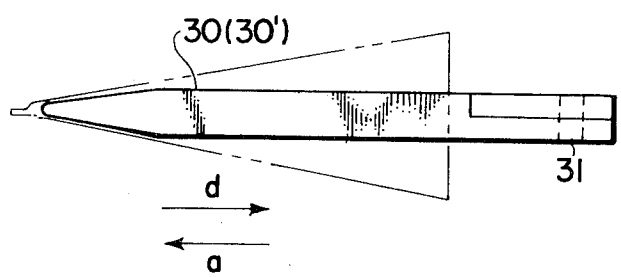

FIGS. 8 to 10 are supplementary to FIG. 6. FIG. 8 shows the holding device expanding the bag. The closed compasses 30, 31 shown in FIGS. 9, 10 are first inserted in the direction of arrow $a$ into the open end of the bag; then the compasses are spread in a pivotal movement $b$ to separate the sides of the bag from its open end to a location adjacent to its sealed end, and thereafter the compasses are closed to their original position by the pivotal movement $c$ and withdrawn from the bag in the direction of arrow $d$.

Figure 11:
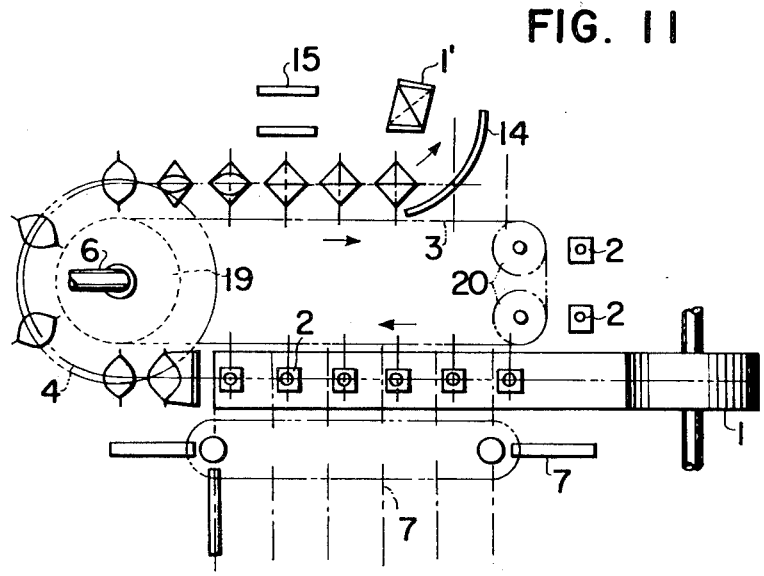
FIGS. 11 and 12 are views similar to FIGS. 2 and 1, respectively, in which the vacuum holding device is replaced by an adhesive holding device.
Figure 12:
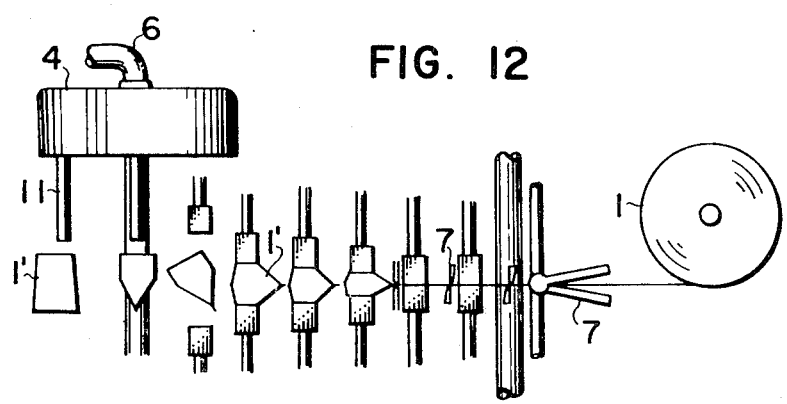

FIGS. 11 and 12 show a machine in which the adhesive holding device shown in FIG. 6 is used instead of the vacuum holding device of the embodiment of FIGS. 1 to 3.

Figure 13:
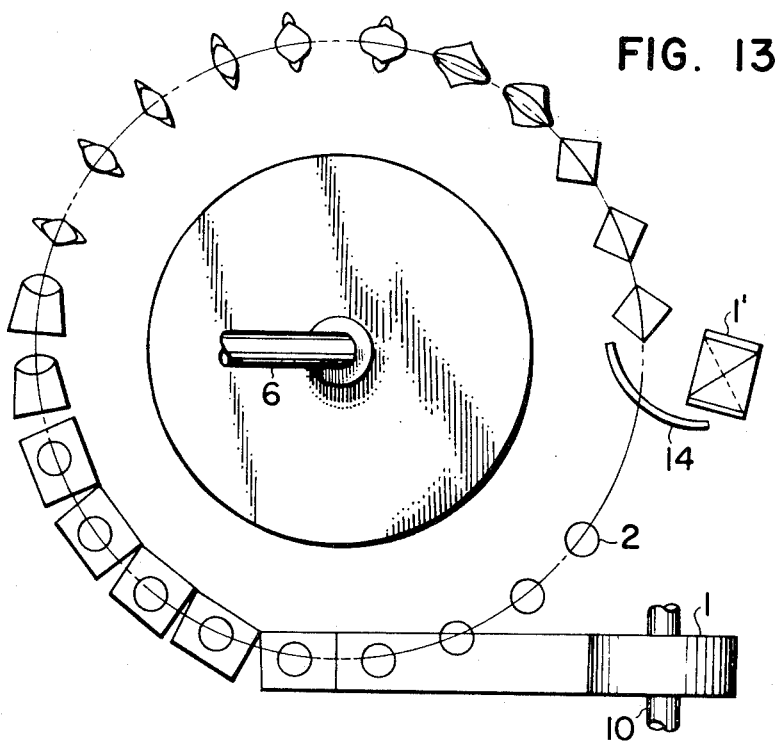
FIG. 13 is a plan view showing the operation of a rotary type of apparatus.
Figure 14:
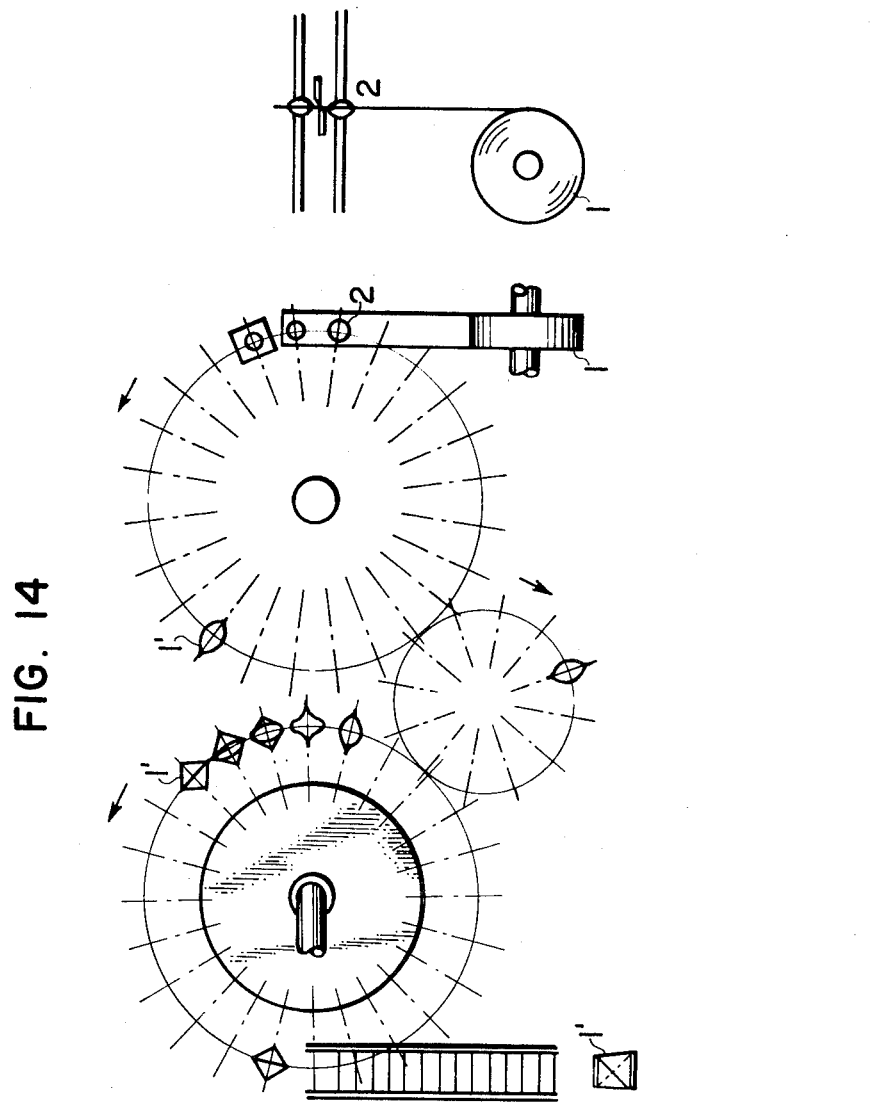
FIG. 14 is a plan view showing the bag-forming and bag-filling operations taking place on separate circular sections of a machine.

FIG. 13 illustrates that the filling and sealing of the container by the devices described hereinbefore is also possible by means of a machine using circular travel only. FIG. 14 is a schematic showing in which two circular motion machines are located with a rotary transfer device arranged therebetween. The feeding, cutting, sealing and expanding of the bag take place on the rotary machine at the right side, then this expanded bag is fed to the filling machine at the left side through the intermediate rotary transfer device; and when the filling is finished, the open end of the bag is sealed.

Figure 15:
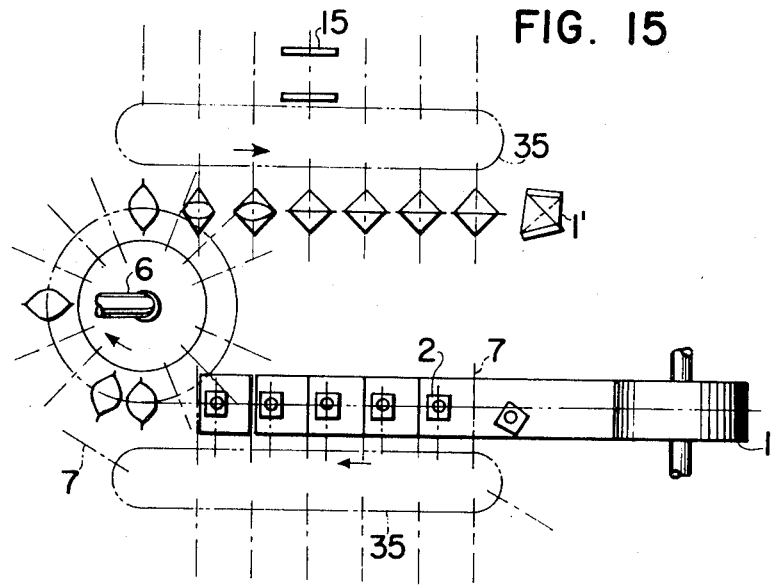
FIGS. 15 and 16 are views similar to FIGS. 2 and 1, respectively, showing a moving heat sealing device.
Figure 16:
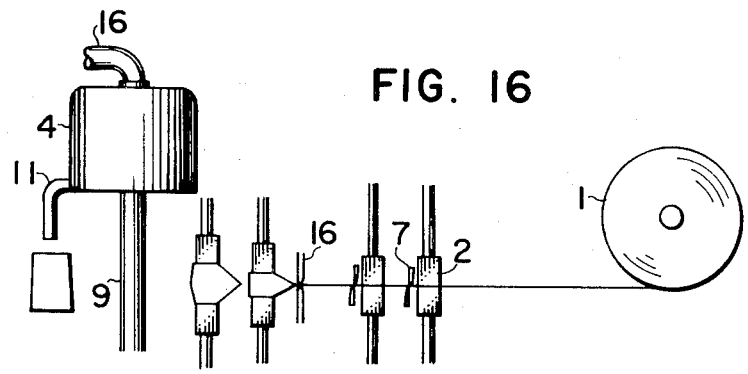

FIGS. 15 and 16 show a method employing a rotary machine and two endless chains on opposite sides thereof. After forming the bag as before, the filling of the bag is finished at the circular rotary part through the pipe 11 from the reservoir tank 4 rotating around the shaft 38; then the upper part of the bag is sealed to make a tetrahedron by the heat seal member 15 mounted on the chain 38.

Figure 17:
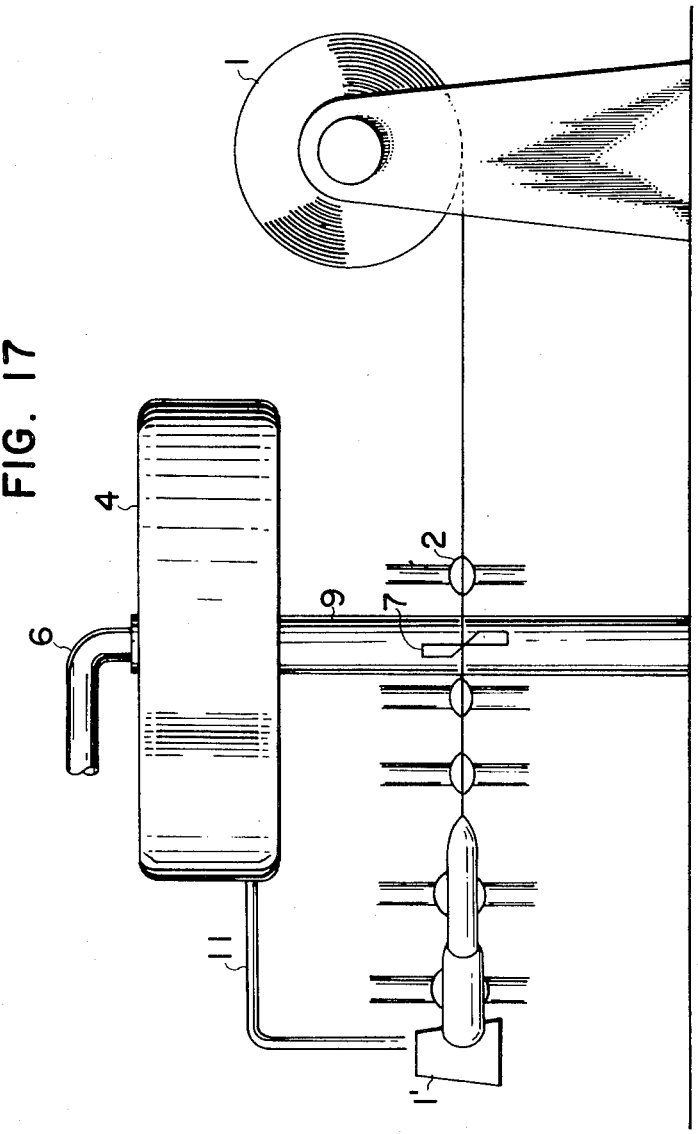
FIG. 17 is an elevation showing these filling steps.

FIG 17 is an elevation showing a filling method suitable for this invention.

Figure 18:
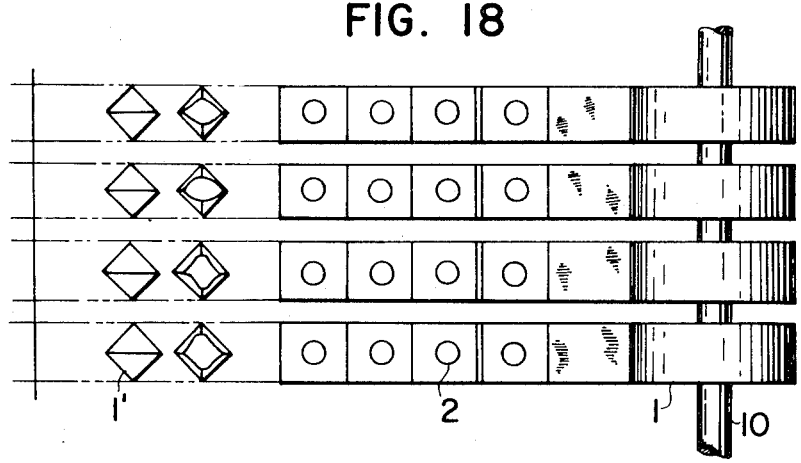
FIGS. 18 and 19 are a plan view and an elevation view, respectively, showing the method in which all steps of forming, filling, and sealing the tetrahedron container are performed in a straight line.
Figure 19:
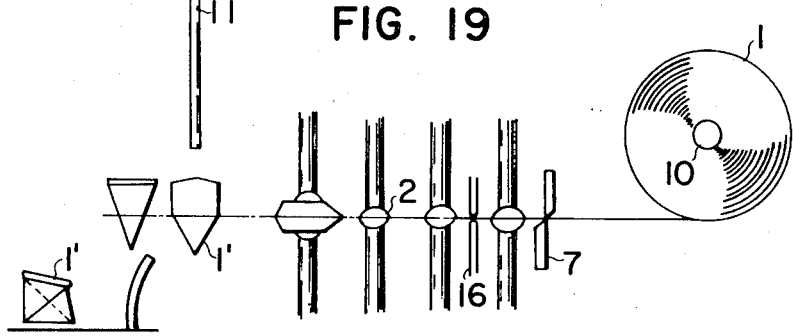

FIGS. 18 and 19 show a multiple line system in which all of the aforesaid steps are performed in straight and parallel line operations which start with four rolls of flattened seamless tubing 1.

Several advantages can be listed for preferring the adhesive holding device 2' over the vacuum holding device 2.

A. A vacuum source is not necessary.

B. Complicated piping is not necessary.

C. The forming can be securely made by the extendable compasses after heat sealing. Since the compasses are heated to 100°C or more, they are hygienic. Moreover, since hot air is in the meantime blown in, a hygienic forming is provided.

D. Since the expanding and forming are accomplished by the adhesive tape on the roller, the mechanism of the machine is very simple and speedy. Besides, a small machine serves the purpose.

E. By mounting the adhesive tape on the roller, the effective area of the tape may be moved, so that the number of adhesion operations may reach ten thousand, as an example, before tape replacement is necessary.

I claim:

1. A method of forming and filling containers comprising the steps of gripping the leading edge of a continuous flattened seamless tube of flexible synthetic resin thermoplastic material and withdrawing it in a horizontal plane from a supply station and pulling a section of the material of a predetermined length past a cutting station, cutting the section of predetermined length and completely heat sealing the trailing end of the section while maintaining the gripping engagement with the leading end, continuing the movement of the section in a horizontal plane and while continuing the gripping engagement with the leading end opening the leading end and separating the inside surfaces of the section, releasing the gripping contact on the section and displacing the section from the horizontal plane into a vertical orientation with its open leading end facing upwardly and its sealed trailing end directed downwardly, moving the vertically oriented section into a loading station and filling the section through its open leading end with a pourable substance, withdrawing the filled section from the loading station and completely heat sealing the leading end of the filled section so that the sealed leading end lies in a plane extending transversely of the plane containing the sealed trailing end of the section and thereby providing the filled section with a tetrahedral shape.

2. A method as set forth in claim 1, characterized therein by providing an adhesive action for gripping the leading end of the material.

3. A method, as set forth in claim 1, characterized therein by providing a suction action for gripping the leading end of the material.

4. A method, as set forth in claim 1, characterized therein by sterilizing the interior of the cut section after the sealing of its trailing end and prior to the commencement of the filling step.

* * * * *